(12) United States Patent
Mereness

(10) Patent No.: US 6,519,814 B1
(45) Date of Patent: Feb. 18, 2003

(54) GLASS FIBER WRAP

(75) Inventor: Richard Ty Mereness, Columbia, MD (US)

(73) Assignee: Ciena Corporation, Linthicum, MD (US)

(*) Notice: Subject to any disclaimer, the term of this patent is extended or adjusted under 35 U.S.C. 154(b) by 0 days.

(21) Appl. No.: 09/917,041

(22) Filed: Jul. 27, 2001

(51) Int. Cl.[7] .......................... A65D 63/00; F16G 11/00
(52) U.S. Cl. ................ 24/16 R; 24/16 PB; 24/17 B; 24/300
(58) Field of Search ................ 24/16 R, 16 PB, 24/17 B, 17 AP, 300, 301, 715.3

(56) References Cited

U.S. PATENT DOCUMENTS

| | | | | |
|---|---|---|---|---|
| 345,154 A | * | 7/1886 | Laughlin | 24/16 R |
| 3,542,321 A | * | 11/1970 | Kahabka | 24/16 R |
| 5,062,184 A | * | 11/1991 | Rowland | 24/16 PB |
| 5,093,964 A | * | 3/1992 | Rowland | 24/16 R |
| 5,167,086 A | * | 12/1992 | Fast | 24/16 PB |
| 5,515,580 A | * | 5/1996 | McHenry, Jr. | 24/16 PB |
| 5,799,376 A | | 9/1998 | Harsley | 24/16 PB |
| 5,878,465 A | * | 3/1999 | Jenner | 24/16 PB |
| 5,881,436 A | * | 3/1999 | Lyons | 24/16 R |

FOREIGN PATENT DOCUMENTS

WO 9600175 * 1/1996 ............ 24/16 R

* cited by examiner

Primary Examiner—Victor Sakran
(74) Attorney, Agent, or Firm—Michael R. Cammarata; James M. Olsen

(57) ABSTRACT

A single, reusable wrap for securing loops of glass fibers of fiber optic cables used in the communications field. The wrap holds the glass fiber loop securely by wrapping around the glass fiber and itself, locking itself in place via an opposing frictional lock. The wrap has a lock portion, a retainer/release tab used to aid in the engagement and release of the frictional lock, and a cylindrical lock portion used to aid in starting the wrap to roll around the glass fiber loop. The frictional lock is provided when the cylindrical lock portion is provided within the lock portion. The reusable wrap is easy to use since it may be opened and closed with one hand by a user. The wrap holds the glass fiber loop tightly without damaging the glass fiber and prevents the glass fiber loop from being pulled into small loops.

15 Claims, 1 Drawing Sheet

GLASS FIBER WRAP

BACKGROUND OF THE INVENTION

A. Field of the Invention

The present invention relates generally to the communications field, and, more particularly to a wrap for securing loops of glass fibers of fiber optic cables used in the communications field.

B. Description of the Related Art

Presently, it is a problem in the field of communication cable installation to store and route communication cable without the possibility of damage to the communication cable by the provision of tight bends, or inappropriate use of fasteners, or inadequate support to the communication cable. Such communication cables include conventional telephone cable having a plurality of copper conductors, coaxial cable, optical fiber, or the like. In all of these applications, the minimum radius of curvature of the communication cable is well defined, and bending the communication cable in a tighter bend can cause damage to the communication medium housed within the cable. The installer of communication cable is thus faced with the problem of routing the communication cable over surfaces, which typically include sharp bends, without over bending the communication cable, yet also securing the communication cable to these surfaces in a manner to ensure protection from damage.

This problem is further heightened when fiber optic cables are used. Glass fibers used in such cables are easily damaged when bent too sharply and require a minimum bend radius to operate within required performance specifications. The minimum bend radius of a fiber optic cable depends upon a variety of factors, including the signal handled by the fiber optic cable, the style of the fiber optic cable, and equipment to which to fiber optic cable is connected. For example, some fiber optic cables used for internal routing have a minimum bend radius of 0.75 inches, and some fiber optic cables used for external routing have a minimum bend radius of 1.0 inches.

Damaged fiber optic cables may lead to a reduction in the signal transmission quality of the cables. Accordingly, fiber optic cables are evaluated to determine their minimum bend radius. As long as a fiber optic cable is bent at a radius that is equal to or greater than the minimum bend radius, there should be no reduction in the transmission quality of the cable. If a fiber optic cable is bent at a radius below the minimum bend radius determined for such cable, there is a potential for a reduction in signal transmission quality through the bend. The greater a fiber optic cable is bent below its minimum bend radius, the greater the potential for breaking the fibers contained in the cable, and the shorter the life span of the cable.

Glass fibers used in fiber optic cables generally come in predetermined lengths, e.g., three foot and six foot lengths. It is necessary to provide a means to control these lengths of fiber optic cables during transport, and during interconnection with optical communications equipment. This is typically accomplished by wrapping the fibers into a loop having a radius at least as large the minimum bend radius of the glass fiber, and holding the loop together with a fastening means.

One type of conventional fastening means is a silicon tube having a slice down one side to allow the glass fiber loop to be cradled inside the tube. Another conventional fastening means is a tie strip that includes a series of unit cell portions, each including a relatively small rectangular aperture and one or more latch members. U.S. Pat. No. 5,799,376 discloses a conventional tie strip. Tie wraps may also be used as a conventional fastening means. As also disclosed in U.S. Pat. No. 5,799,376, a conventional tie wrap includes a length of flexible material having an apertured head portion at one end, and a tail portion, which can be passed through the aperture of the head portion and has a series of laterally projecting latch portions for preventing withdrawal from the aperture. Such conventional fastening means have many disadvantages, including non-reusability, and holding the glass fiber too loosely such that the glass fiber may be easily pulled into small loops, which can damage or break the glass fiber.

The most common means used to hold glass fibers in a loop is tape. Tape offers several disadvantages such as a sticky residue on the glass fiber, and more frequent fiber breaks due to the glass fiber sticking to the tape and due to the tape sticking to or getting caught on other objects when transporting the glass fiber loop. Wrapping the tape around the glass fiber loop is also time consuming.

Thus, there is a need in the art to provide an inexpensive, easy-to-use, reusable means for tightly securing a glass fiber loop without damaging the glass fiber or allowing the glass fiber to be pulled into loops beyond the minimum bend radius of the glass fiber.

SUMMARY OF THE INVENTION

The present invention solves the problems of the related art by providing a single, reusable wrap for securing loops of glass fibers of fiber optic cables used in the communications field. The wrap holds the glass fiber loop securely by wrapping around the glass fiber and itself, locking itself in place via an opposing frictional lock. The wrap has a release tab used to aid in the release of the frictional lock, and a cylindrical lock used to aid in starting the wrap to roll around the glass fiber.

In accordance with the purpose of the invention, as embodied and broadly described herein, the invention comprises a glass fiber wrap having: a web portion having a first end and a second end; a lock portion integrally connected to the first end of the web portion, the lock portion having a thickened wall forming a lock recess therein, and a retainer/release tab integrally connected to the thickened wall; and a hook portion integrally connected to the second end of the web portion.

Further in accordance with the purpose of the invention, as embodied and broadly described herein, the invention comprises a method of using a glass fiber wrap having a web portion having a first end and a second end, a lock portion integrally connected to the first end of the web portion, the lock portion having a thickened wall forming a lock recess therein, and a retainer/release tab integrally connected to the thickened wall, and a hook portion integrally connected to the second end of the web portion, comprising: providing a portion of a glass fiber coil on the web portion; and rolling the hook portion towards the retainer/release tab until the hook portion is retained within the lock recess of the lock portion.

Still further in accordance with the purpose of the invention, as embodied and broadly described herein, the invention comprises a method of using a glass fiber wrap having a web portion having a first end and a second end, a lock portion integrally connected to the first end of the web portion, the lock portion having a thickened wall forming a lock recess therein, and a retainer/release tab integrally connected to the thickened wall, and a hook portion integrally connected to the second end of the web portion, comprising: forcing the retainer/release tab away from the web portion, until hook portion disengages the lock recess of the lock portion; and removing a glass fiber coil from the glass fiber wrap.

Even further in accordance with the purpose of the invention, as embodied and broadly described herein, the invention comprises a wrap for holding a coil of a cable having a minimum bend radius, having: a web portion having a first end and a second end; a lock portion integrally connected to the first end of the web portion, the lock portion having a thickened wall forming a lock recess therein, and a retainer/release tab integrally connected to the thickened wall; and a hook portion integrally connected to the second end of the web portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 2:
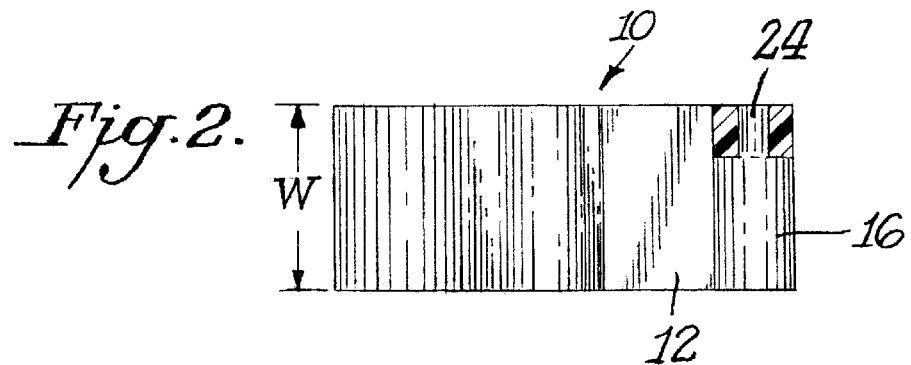
FIG. 2 is a top plan view, partially broken away, of the glass fiber wrap shown in FIG. 1.

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Referring now specifically to the drawings, an embodiment of the glass fiber wrap of the present invention is illustrated in FIGS. 1–4, and shown generally as reference numeral 10. Glass fiber wrap 10 includes a web portion 12 integrally connected to a lock portion 14 at one end and to a cylindrical book portion 16 at another end. Glass fiber wrap 10 may be formed from numerous materials, but preferably is formed from a soft, resilient material that permits wrap 10 to flex open and closed. Such resilient materials may include, for example, a conductive or nonconductive silicon material, a rubber (natural or synthetic) material, a soft plastic material, or a recycled soft plastic material.

Figure 1:
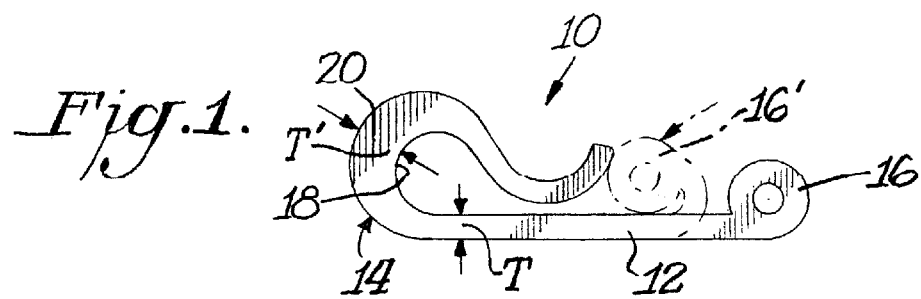
FIG. 1 is a side elevational view of a glass fiber wrap in its open position and in accordance with an embodiment of the present invention, and showing a cylindrical hook portion in phantom and just before it rolls into its locked position.

As shown in FIG. 1, lock portion 14 of wrap 10 includes a lock recess 18 formed by a thickened wall 20, and a retainer/release tab 22 integrally connected to thickened wall 20. FIG. 1 shows glass fiber wrap 10 in its open position, that is, when cylindrical hook portion 16 is laying flat. FIG. 1 also shows wrap 10 with cylindrical hook portion 16' in phantom just before it rolls into its locked position.

As best shown in FIG. 2, cylindrical hook portion 16 may include an opening 24 therethrough, although hook 16 may be made of a solid cylinder. Opening 24 may be included in hook portion 16 to permit the material making up the hook portion 16 to dry more easily and evenly. Cylindrical hook portion 16 aids in starting glass fiber wrap 10 to roll around the glass fiber loop or coil to be retained therein. Hook portion 16 may also be made of shapes other than cylindrical. For example, hook portion 16 be oval-shaped or spiral-shaped.

Figure 3:
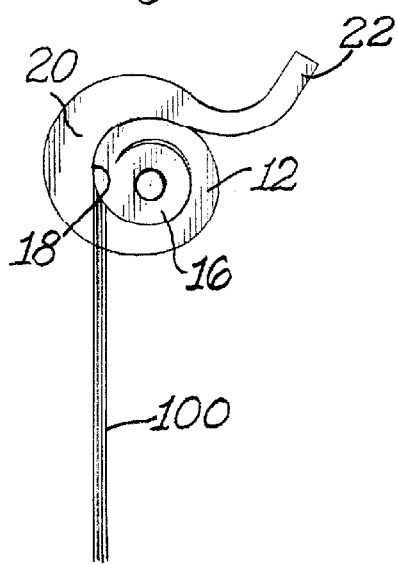
FIG. 3 is a side elevational view of the glass fiber wrap shown in FIGS. 1 and 2 in its locked position and holding a loop or coil of glass fibers.
Figure 4:
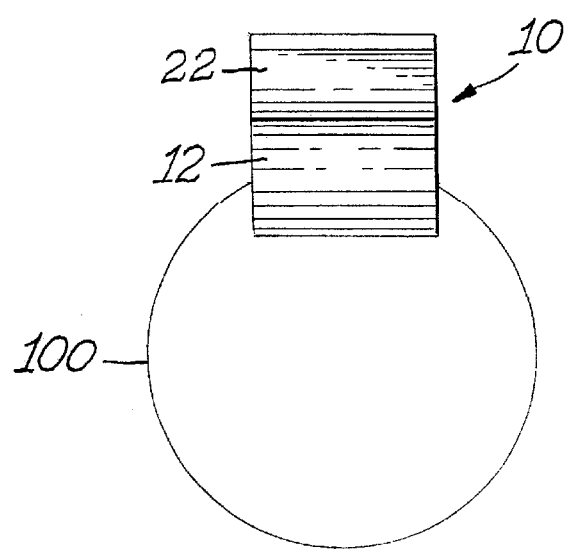
FIG. 4 is a front elevational view of the glass fiber wrap shown in FIGS. 1–3 in its locked position and holding the loop or coil of glass fibers.

To retain and secure a glass fiber loop or coil within wrap 10, a user first provides a portion of the loop or coil on web portion 12, and then begins rolling cylindrical hook portion 16 towards retainer/release tab 22, shown in phantom as reference numeral 16' in FIG. 1. When cylindrical hook portion 16 is rolled down the length of wrap 10, web portion 12 begins to bend and cylindrical hook portion 16 begins to force retainer/release tab 22 upwards. FIGS. 3 and 4 show glass fiber wrap 10 in its locked position, with cylindrical hook portion 16 and web portion 12 being retained within lock recess 18 of lock portion 14, and a glass fiber loop or coil 100 being retained between the rolled web portion 12 and cylindrical hook portion 16. The locking of glass fiber wrap 10 may be accomplished with one hand of the user.

In its locked position, wrap 10 firmly holds glass fiber loop or coil 100 without damaging the glass fiber. Glass fiber wrap 10 holds the glass fiber loop or coil 100 between its portions, creating a friction hold between the glass fiber loop or coil 100 and wrap 10. Wrap 10 holds itself together in the rolled, locked position due to the frictional lock or contact between the surfaces of lock recess 18, web portion 12, and cylindrical hook portion 16. The natural elastic action of the lock recess 18, as provided by thickened wall 20 and the elastic properties of the material used to construct wrap 10, and the high coefficient of friction of the wrap material prevents cylindrical hook portion 16 and web portion 12 from unrolling from lock recess 18. This prevents glass fiber loop or coil 100 from uncoiling and thus damaging the glass fiber.

To release glass fiber loop or coil 100 from wrap 10, a user need only force retainer/release tab 22 away from web portion 12, until cylindrical hook portion 16 disengages or unlocks from lock recess 18 of lock portion 14. Once disengaged from lock recess 18, cylindrical hook portion 16 eventually returns to its position shown in FIG. 1. A user may then remove glass fiber loop or coil 100 from wrap 10. The releasing of glass fiber wrap 10 may be accomplished with one hand of the user.

Glass fiber wrap 10 may be a variety of sizes dependent upon the size of the glass fiber loop or coil 100 to be carried by wrap 10. Byway of example only and as shown in FIGS. 1 and 2, wrap 10 may have a width W of approximately 0.375 to 1.0 inches. The thickness of wrap 10 varies across its cross-section, but generally has a thickness T of approximately 0.05 inches. The thickness T' of thickened wall 20 may also vary, but preferably is approximately 0.065 inches.

The glass fiber wrap of the present invention provides many advantages over the conventional fastening means described above. The wrap of the present invention is easy to use since it may be opened and closed with one hand. The wrap is also reusable, unlike tape and tie wraps. Furthermore, the wrap of the present invention holds the glass fiber loop tightly without damaging the glass fiber and preventing the glass fiber loop from being pulled into small loops. Finally, the glass fiber wrap provides cost savings since it is reusable and prevents costly glass fiber breakage.

It will be apparent to those skilled in the art that various modifications and variations can be made in the glass fiber wrap of the present invention and in construction of the wrap without departing from the scope or spirit of the invention. The physical dimensions, angle and degree ranges, material selection, etc., discussed above and shown in the FIGS., are purely exemplary and not limiting of the embodiments of the present invention. Furthermore, the present invention is not limited to use with fiber optic cables, and may be used with any cable having a minimum bend radius, such as, for example, electrical cable having a plurality of copper conductors, coaxial cable, or the like.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A wrap for holding a cable, comprising:
   a web portion having a first end and a second end;
   a lock portion integrally connected to the first end of said web portion, said lock portion having a thickened wall forming a lock recess therein, and a retainer/release tab integrally connected to the thickened wall; and
   a hook portion integrally connected to the second end of said web portion, wherein said hook portion is receivable within the lock recess of said lock portion.

2. A wrap for holding a cable as recited in claim 1, wherein the wrap is for holding a coil of cable.

3. A wrap for holding a cable as recited in claim 1, wherein the cable is selected from the group consisting of a glass fiber, an electrical cable, or a coaxial cable.

4. A wrap for holding a cable as recited in claim 1, wherein said hook portion is cylindrical.

5. A wrap for holding a cable as recited in claim 1, wherein said hook portion comprises a cylinder having an opening provided therethrough.

6. A wrap for holding a cable as recited in claim 1, wherein the cable is retained within the wrap when said hook portion is received within the lock recess of said lock portion.

7. A wrap for holding a cable as recited in claim 1, wherein when said hook portion is received within the lock recess of said lock portion, said hook portion frictionally contacts an inner surface of the thickened wall of said lock portion.

8. A wrap for holding a cable as recited in claim 1, wherein the wrap has a width of approximately 0.375 to 1.0 inches.

9. A wrap for holding a cable as recited in claim 1, the wrap has a thickness of approximately 0.05 inches.

10. A wrap for holding a cable as recited in claim 1, wherein the thickened wall of said lock portion has a thickness of approximately 0.065 inches.

11. A wrap for holding a cable as recited in claim 1, wherein the wrap is made of a resilient material.

12. A wrap for holding a cable as recited in claim 11, wherein the resilient material comprises a conductive silicon material.

13. A wrap for holding a cable as recited in claim 11, wherein the resilient material comprises a nonconductive silicon material.

14. A wrap for holding a cable as recited in claim 1, wherein the wrap is made of a material that permits hook portion to roll into and frictionally engage the lock recess of said lock portion, and return back to its original position when the retainer/release tab is released.

15. A wrap for holding a cable as recited in claim 1, wherein a plurality of cables are retained within the wrap when said hook portion is received within the lock recess of said lock portion.

* * * * *